(No Model.) 2 Sheets—Sheet 1.

V. W. MASON.
LOCK BRAKE.

No. 496,268. Patented Apr. 25, 1893.

WITNESSES
C. Neveux
C. Sedgwick

INVENTOR
V. W. Mason
BY Munn & Co
ATTORNEYS.

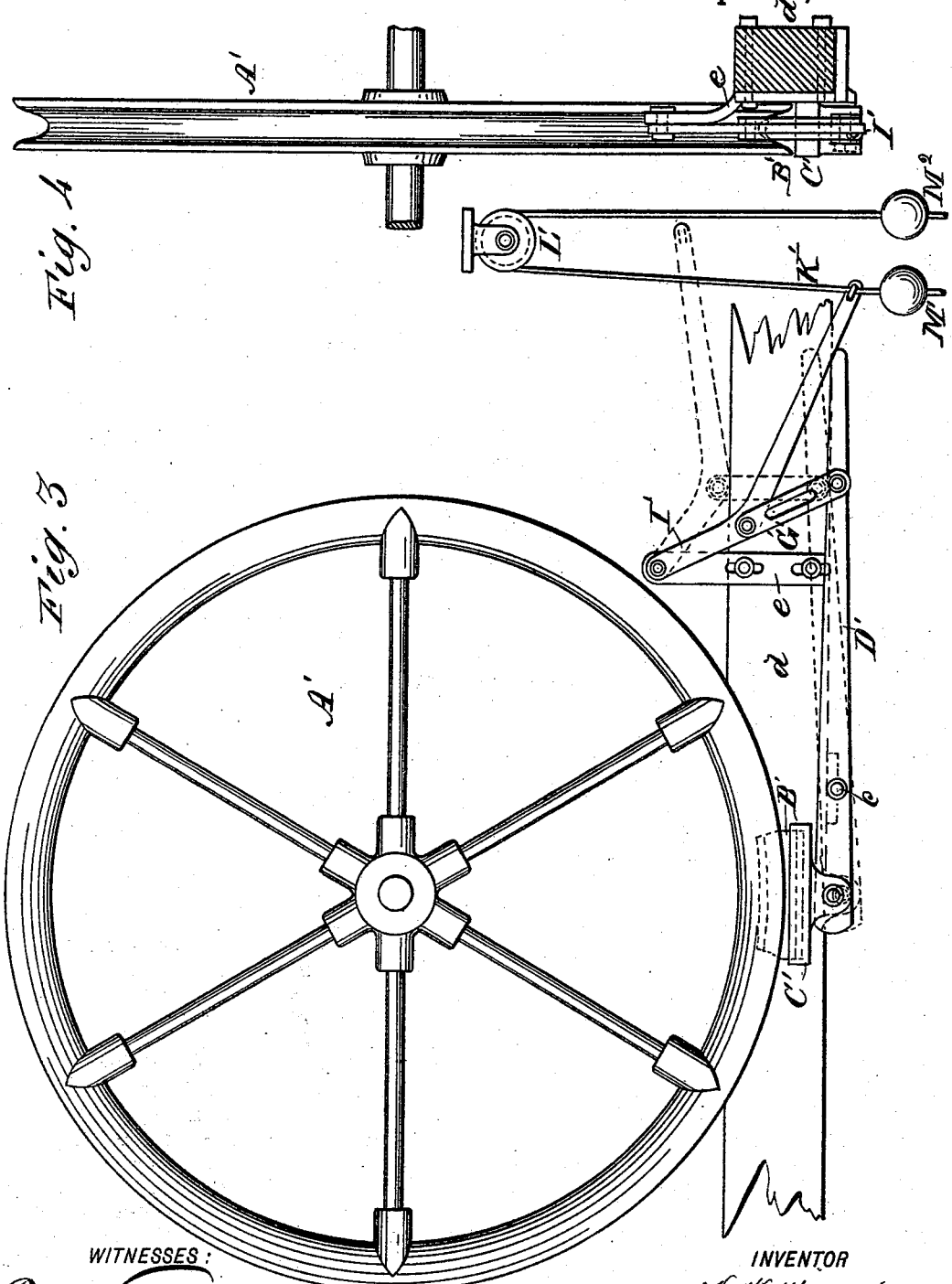

UNITED STATES PATENT OFFICE.

VOLNEY W. MASON, OF PROVIDENCE, RHODE ISLAND.

LOCK-BRAKE.

SPECIFICATION forming part of Letters Patent No. 496,268, dated April 25, 1893.

Application filed May 27, 1892. Serial No. 434,585. (No model.)

*To all whom it may concern:*

Be it known that I, VOLNEY W. MASON, of Providence, in the county of Providence and State of Rhode Island, have invented a new and Improved Lock-Brake for Hoisting-Machines, of which the following is a specification, reference being had to the annexed drawings, forming a part thereof, in which—

Figure 2:
Figure 1:
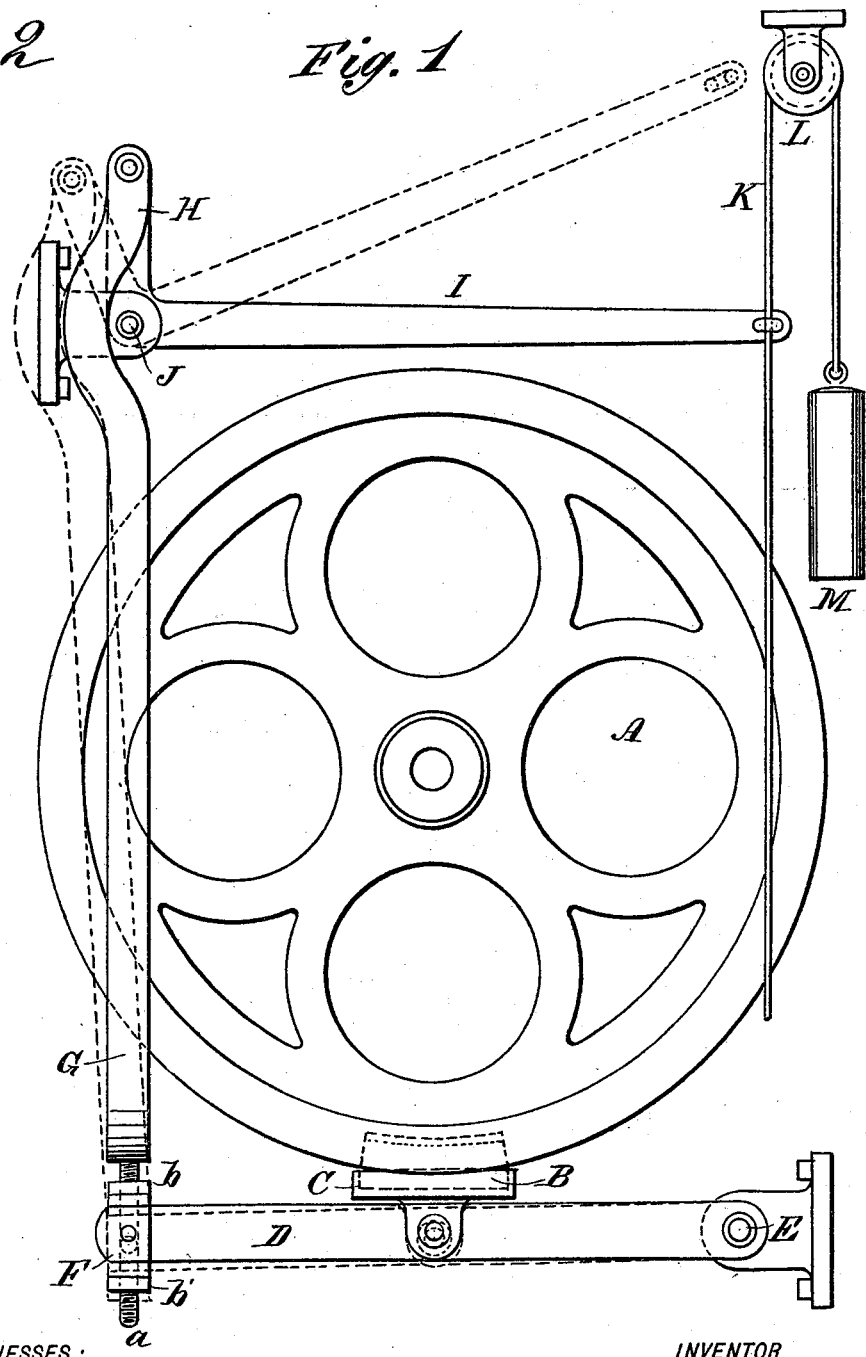

Figure 1 is a side elevation of one form of my improved lock brake for hoisting machines. Fig. 2 is a front elevation of the forked connecting rod. Fig. 3 is a side elevation of a modified form; and Fig. 4 is a front elevation of the same.

Similar letters of reference indicate corresponding parts in all the views.

The object of my invention is to construct a brake for hoisting machines, in which any required amount of pressure may be applied to the wheel, and which will securely lock the wheel when desired so that it will not turn under any load the machine is likely to carry.

My invention consists in the combination with the brake lever, of a toggle joint for moving the brake lever so as to apply the brake, and a weighted cord connected with the brake lever, for operating the same, all as will be hereinafter more fully described.

The wheel A, which in the present case is attached to the shaft of the hoisting drum, has a grooved periphery for receiving the hoisting rope, and to the said grooved periphery is fitted a brake shoe B, contained by a socket C, pivoted to the lever D which is of the second order, having its fulcrum in the stud E, attached to a fixed support. To the free end of the brake lever D is pivoted a block F, through which extends the threaded shank $a$ of the forked connecting rod G. The arms of the said forked connecting rod extend on opposite sides of the wheel A, and are pivoted to the shorter arm H of the right angled lever I, the said lever being of the first order, and having its fulcrum in a stud J attached to a fixed support.

The free end of the lever I, is connected with the cord K, which extends over a pulley L and is attached to the weight M. By drawing downwardly on the cord K, the lever I is turned on its fulcrum and the connecting rod G is drawn upwardly, applying the brake shoe B to the wheel. By a further movement of the lever I, the pivotal connection of the rod G with the short arm H of the said lever is carried beyond the fulcrum of the lever I, thereby locking the system of levers by which the brake shoe is held in contact with the periphery of the wheel A, thus preventing the said wheel from turning. The rod G is prevented from passing too far beyond the fulcrum of the lever I, by contact with the stud J. By releasing the cord K, the weight M retracts the lever I, unlocks the system of levers and releases the brake.

When it becomes necessary to adjust the position of the lever D relative to the connecting rod G and lever I, to compensate for wear of the brake shoe or of the wheel, or of any other part of the brake system, the adjustment is made by turning the nuts $b$, $b'$, one way or the other upon the threaded shank $a$.

In the form shown in Figs. 3 and 4, the brake shoe B' is applied to the wheel A', by the lever D' of the first order, which turns on a fulcrum $c$ supported by the beam $d$. The socket C' which contains the brake shoe is pivoted to the shorter arm of the lever D'. To the beam $d$ is secured an adjustable post $e$, to which is pivoted a bent lever I' of the first order, and to the angle of said lever is pivoted a link G' which is also pivotally connected with the longer arm of the lever D'. The free end of the lever I', is connected with the cord K', which extends over a pulley L' and is provided with weights M', $M^2$ on opposite sides of the pulley. When the part of the cord K' which carries the weight M' is drawn downwardly, the lever I' straightens the toggle formed by the said lever and link G', thus forcing downwardly the longer arm of the lever D', and applying the brake shoe B' to the wheel A'. By carrying the lever I' still farther, the pivotal connection of the link G' with the lever I' is carried beyond the line of centers of the fulcrum of the said lever and the pivotal connection of the link G' with the lever D', thereby locking the system of levers so as to hold the brake shoe B' in firm contact with the periphery of the wheel A'. The lock of the said system of levers is broken by drawing upon the part of the cord which carries the weight $M^2$, thus releasing the brake.

Having thus described my invention, I claim as new and desire to secure by Letters Patent—

1. In a hoisting machine, the combination with the brake lever, of a toggle joint constructed for applying the brakes, and capable of locking the brake when applied, substantially as specified.

2. In a hoisting machine, the combination of a brake lever, a brake attached to the brake lever, a toggle joint adapted to move and lock the brake lever, and a cord and counterweight for applying and releasing the brake, substantially as specified.

3. In a hoisting machine, the combination with the brake shoe, of a brake lever, an adjustable toggle joint, the toggle joint and brake lever being arranged in such relation to each other as to lock the toggle joint when the brake is applied, substantially as described.

4. In a hoisting machine, the combination with the grooved wheel, of the brake shoe fitted to the wheel, a socket for receiving the shoe, a brake lever, an adjustable toggle joint connected with the brake lever and arranged to apply the same to the wheel, an operating cord attached to the toggle joint and provided with a weight, and a pulley for supporting the cord and the weight, substantially as specified.

VOLNEY W. MASON.

Witnesses:
BENJAMIN F. FENNER,
EDGAR H. BOSS.